March 30, 1954 P. L. G. MOREL 2,673,951

RECOPYING SERVO MECHANISM

Filed June 11, 1951

3 Sheets-Sheet 1

Inventor:
Pierre Louis Gabriel Morel;
By his attorneys,
Baldwin & Wight

March 30, 1954 P. L. G. MOREL 2,673,951

RECOPYING SERVO MECHANISM

Filed June 11, 1951 3 Sheets-Sheet 2

Inventor: Pierre Louis Gabriel Morel;
By his attorneys,
Baldwin & Wight

March 30, 1954

P. L. G. MOREL 2,673,951

RECOPYING SERVO MECHANISM

Filed June 11, 1951

3 Sheets-Sheet 3

Inventor: Pierre Louis Gabriel Morel,
By his attorneys,
Baldwin & Wight

Patented Mar. 30, 1954

2,673,951

UNITED STATES PATENT OFFICE 2,673,951

RECOPYING SERVO MECHANISM

Pierre Louis Gabriel Morel, Paris, France, assignor to Societe d'Electronique et d'Automatisme, Paris, France, a corporation of France Application June 11, 1951, Serial No. 231,005

Claims priority, application France June 19, 1950

4 Claims. (Cl. 318—162)

Figure 1:
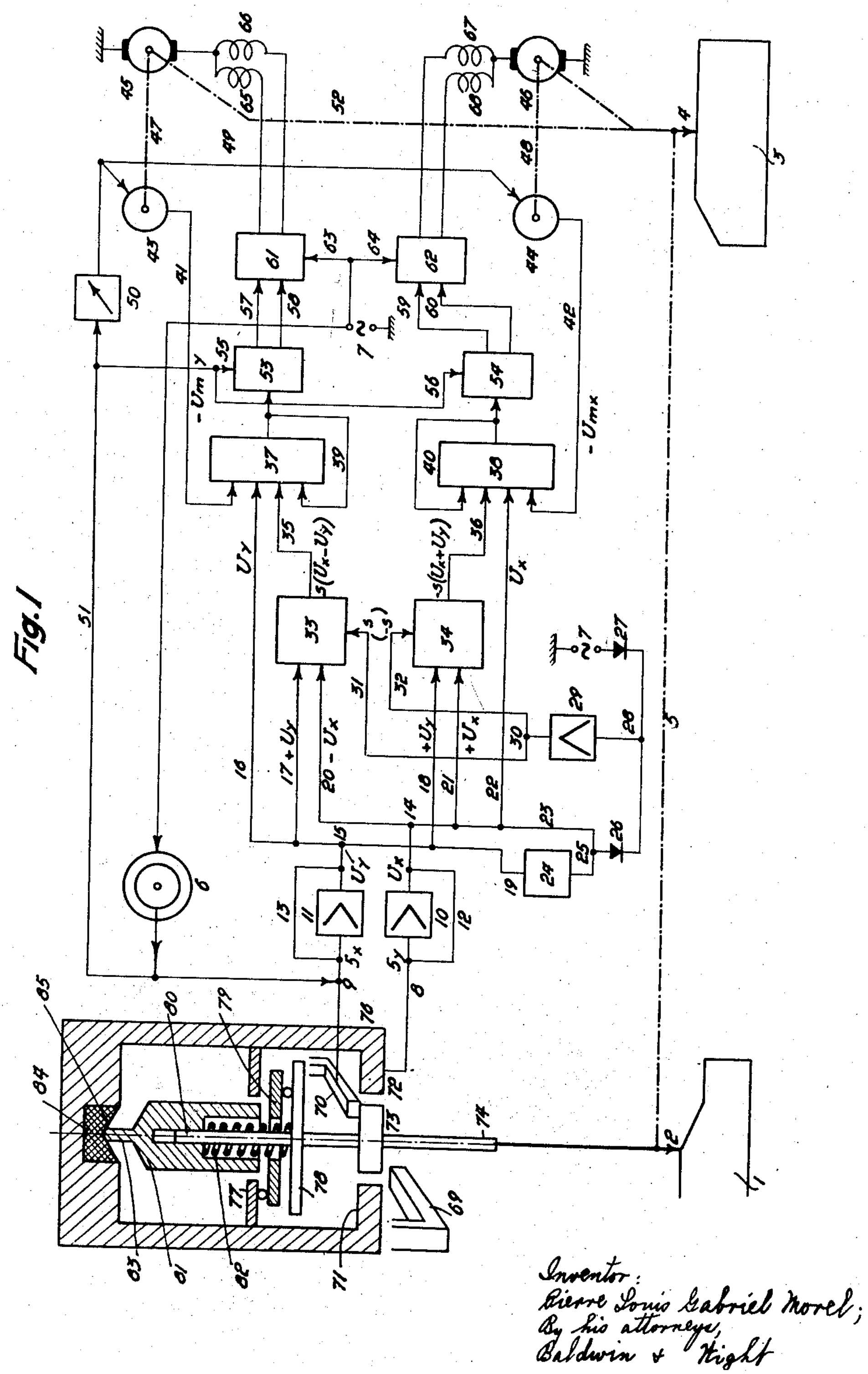

The present invention is concerned with improvements to recopying servo mechanism, which amplify their performances without changing any of their qualities of faithful reproduction and servitude fidelity, independently of profile variations or design to be reproduced.

A recopying servo mechanism should be capable of providing in a homothetic way, the trajectories of a feeling member following the model, and of a reproducing member, reproducing the design or profile of the model, these two members cooperating together through a common driving system that is predetermined and practically independent of the design model; the reproducing member or the reproducing tool, is controlled in its operation by a carriage movement of at least double the range of the feeling member, and the two carriage motors have to be under the servitude of an adjustment spacing, such as $\delta$, in orientation and in modulus, between the contact point of the feeling member on the model and the projection point of the driving device axis, of said feeling member. Such a device is usually referred to as "tracing head."

A tracing head is normally arranged in order to deliver two measuring measures in quadrature, effectively representative of the component values of the adjustment spacing according to the tangent and to the normal at the feeling member contact point with the model profile, in the case, of course, where the adjustment spacing thus measured remains under a predetermined value, such as $\delta_0$; however, the speeds of the carriage motors of the reproducer must not be under the servitude of these components, but under the servitude of the vector representing the displacement speed of the feeling member contact point on the model, such as $\tau$, and it is therefore necessary to insert between the tracing head and the speed servitude devices for the carriage motors, a calculator applying a rotation matrix, such as R, onto the unitary vector of the direction of the vector of spacing $\delta$. This calculator having, on the other hand, determined the adjustment spacing, such as $S=\delta-\delta_0$, then applies onto vector $\tau$ a second rotation matrix, such as R a function of S.

In the U. S. patent application Serial No. 200,381 filed by the applicant December 12, 1950, and now abandoned, for "Improvements in Reproducing Servo-Mechanism," it has been disclosed that a particularly advantageous form, as regards stability and reproducing fidelity, of this matrix R (the matrix $R_0$ being the same as matrix R) was the following:

$$R=\begin{vmatrix} 1-S & -S \\ S & 1-S \end{vmatrix}$$

In the example explaining the present invention, the case of such a rotation matrix will be considered without limitation.

The present invention, in order to simplify equipments and circuits constituting such recopying servo mechanism, provides means enabling such servo-mechanism to operate with a one phase alternating current power supply, contrarily to the servo-mechanism known before, and wherein the alternating current power supply may be dephased, at least for the calculating channel connected with the tracing head and extending to the location of the rotation control circuits of the motors, for which D. C. current control is generally used.

The present invention removes these two servitudes, thus insuring the complete homogeneity of the servitude channel from and comprising the tracing head, till the control of the carriage motors by a combination of means consisting of associating the groups of members and of circuits operating upon servitude and control signals together with reversible carriage motors.

From a co-pending application, filed concurrently with the present application by same applicant, for improvements in or relating to the control of discharge tubes, it is known, in gas or vapor discharge tubes of the type employing grid control, and receiving between the cathode and the plate a low frequency feeding alternating current voltage for the supply of the charge circuit, and connected for instance with a motor, disposed in series between the cathode and the plate with the power supply, that to control the priming and lighting of such tubes, the control signal may be superimposed, in quadrature, as an alternating current voltage of this same low frequency, upon a carrier oscillation of high frequency previously modulated through a servitude signal, more particularly by a direct signal.

As in this case the reversible feeding of a charge is considered, and the control connection of the pair of tubes for this feeding direction is directly determined by adding the carrier oscillation, to the non modulated carrier oscillation in the control signal, in order that the concordance discrimination or phase opposition discrimination of these two oscillations may be directly established for controlling the operation of one or the other control connection.

Tachometer devices are known, where the stator is composed of a magnetic core with two pairs of orthogonal poles, provided with two series connected windings in quadrature and of a ferromagnetical coil surrounding said core, and where the rotor is diamagnetic, and is disposed between said core and said coil and driven from its axis, the rotation of which is controlled, said rotor being composed of a cylindrical member with solid walls, coaxial with said core, and of a bottom plate, also solid, fast with said cylindrical member for completing its mechanical coupling to the rotation axis and wherein an alternating current reference power supply feeds one of the windings, and having an output circuit connected to the other winding for extracting the measuring alternating current voltage.

It is known also, in such tachometer devices that the output circuit may be connected to one input circuit of a voltage divider, the other input circuit of which is supplied with a reference voltage, adjustable in level and phase, extracted on said alternating current power supply of the tachometer device, preferably through a potentiometer fed by the secondary winding, the middle point of which is grounded, of a transformer receiving the voltage of said alternating current power supply. The spacing voltage thus defined is, after amplification, applied to one input of a phase discriminator circuit, the other input of which is applied with the said alternating current power supply, the consequence of which the error signal, in magnitude and in phase, is directed towards one or the other output circuit of the phase discriminator in order to be used for purposes of a feeding regulation signal of one or the other rotation direction of the motor, the speed of which is to be controlled or put under servitude.

Such tachometer devices permit the measurement of the direction and of the magnitude of the rotation speed of the motor to be directly obtained under the shape of an alternating current signal, the effectual value of which measures the speed, and the phase of which indicates the rotation direction; such tachometer devices, also enable an alternating current signal of the adjustment or error spacing to be directly obtained, by dividing the measure signal and the alternating current reference signal or posting signal of same frequency, the phase of which then indicates the direction of the error.

The improvements to recopying servo mechanism, according to the invention take advantage of the above mentioned known arrangements, in combining such arrangements with a circuit arrangement of the measured components of an adjustment spacing S as hereinafter defined.

The first important feature in such improvements is to provide a tracing head with a magnetic circuit balanced around the mobile core carrying the feeling member, said magnetic circuit comprising two pairs of orthogonal poles surrounding or enclosing said core, centered under balanced or rest condition. Each pair of poles is provided with windings, arranged in opposition and forming two legs of a Wheatstone bridge, the two other legs of which are made of two balancing resistors. One winding pair is fed by a one phase alternating current oscillation, and the outputs of the measuring voltages of components $\delta x$ and $\delta y$ are connected with the output terminals of the bridge, and circuits completed from the connection points of the windings to the connection points of the resistors.

Another important feature of said improvements, considering that the two measuring voltages are combined again, with additional setting in quadrature of the voltages one with respect to the other, in order to deliver at the terminals of a rectifier, a direct voltage determinative of the spacing $\delta$ and to which is opposed to direct voltage determinative of the maximum desirable spacing $\delta_0$, hence the application of voltages ±S onto the two outputs of said circuit, that the measuring voltage representative of $\delta x$ is directly considered, in being applied onto the computer, as representative of the component $Uy$ of the displacement speed vector of the feeding member onto the model design, and that, reciprocally, the measuring voltage representative of $\delta y$ is directly considered as determinative of the component $Ux$ of the same vector; therefore, the value comparison of the components of the displacement speed of the feeling member on the model and of the tool speed (components delivered by tachometer devices fed by the same alternating current oscillation to the tracing head such as $Umx$ and $Umy$) is directly performed in adding the components $Ux$ and $Umx$ to the components $Uy$ and $Umy$, in other extraction outputs of the voltages delivered by the tracing head, in the suitable phases for controlling the desired rotation matrix of stabilization.

In order to simplify the foregoing disclosure, it will be considered hereafter that the voltage notations will designate effectual values, the sign (+) for such an effectual value designating a voltage in phase with the reference alternative voltage, and the sign (−) designating a voltage phase opposed to said reference oscillation; in practice, those phase modifications are performed in the circuits by simple inversion of the connections.

A further feature of the improvements according to the invention, when applying a rotation matrix function of S, adjustment spacing, onto the components $Ux$ and $Uy$ of vector $\tau$, and with the above mentioned convention $\pm Ux$ for the voltage $\pm\delta y$ and $\pm Uy$ for the voltage $\pm\delta x$, in one travel direction of the model, and vice-versa for the other travel direction, is that the outputs of voltages ±S of this adjustment spacing are applied, as modulation connections, onto two modulators, supplied as for carrier frequency oscillations by suitable combinations of the voltages of components $Ux$ and $Uy$ in phase, corresponding to those combinations.

In this respect, the present invention, more particularly provides for modulators of the well known type associated with dry type rectifiers, the above combinations of component voltages being introduced by providing multiple primaries to the input transformers of those modulators and the voltages ±S being applied, respectively, onto the middle points of the input and output transformers of those modulators (input secondaries and output primaries).

The voltages supplied by the comparison between the displacement speed values of the feeling member with the displacement speed of the reproducing tool, resulting as above mentioned from adding, in suitable phases, voltages $Ux$ and $Umx$ to voltages $Uy$ and $Umy$, are then directly added to the output voltages of the modulators.

The servitude signals thus being controlled, another feature of the improvements according to the invention, and considering that the control of the carriage motors is performed through the above mentioned means, is that the polarization of the discharge tubes is obtained by introducing a sole polarization voltage in both directions. This is effected in parallel by superposition through series connections of transformer windings, the insertion of the low frequency feeding voltages in quadrature, in their suitable phases, and the automatic determination of the discharge tubes operating alternately through phase discrimination resulting from the series insertion of the reference voltage which is the same as the voltage feeding the tracing head and the motors and tachometers, the latter, in quadrature with the tracing head.

These improvements, together with the result of their combination will now be hereafter described more in detail, in considering the case of recopying servo-mechanism, the stabilization matrix of which is such as above mentioned and with reference to the accompanying drawings which diagrammatically show the invention and in which:

Fig. 1 illustrates the general arrangement of the servo-mechanism of my invention and also an elevation simplified view, of an illustrative example of a tracing head.

Figure 2:
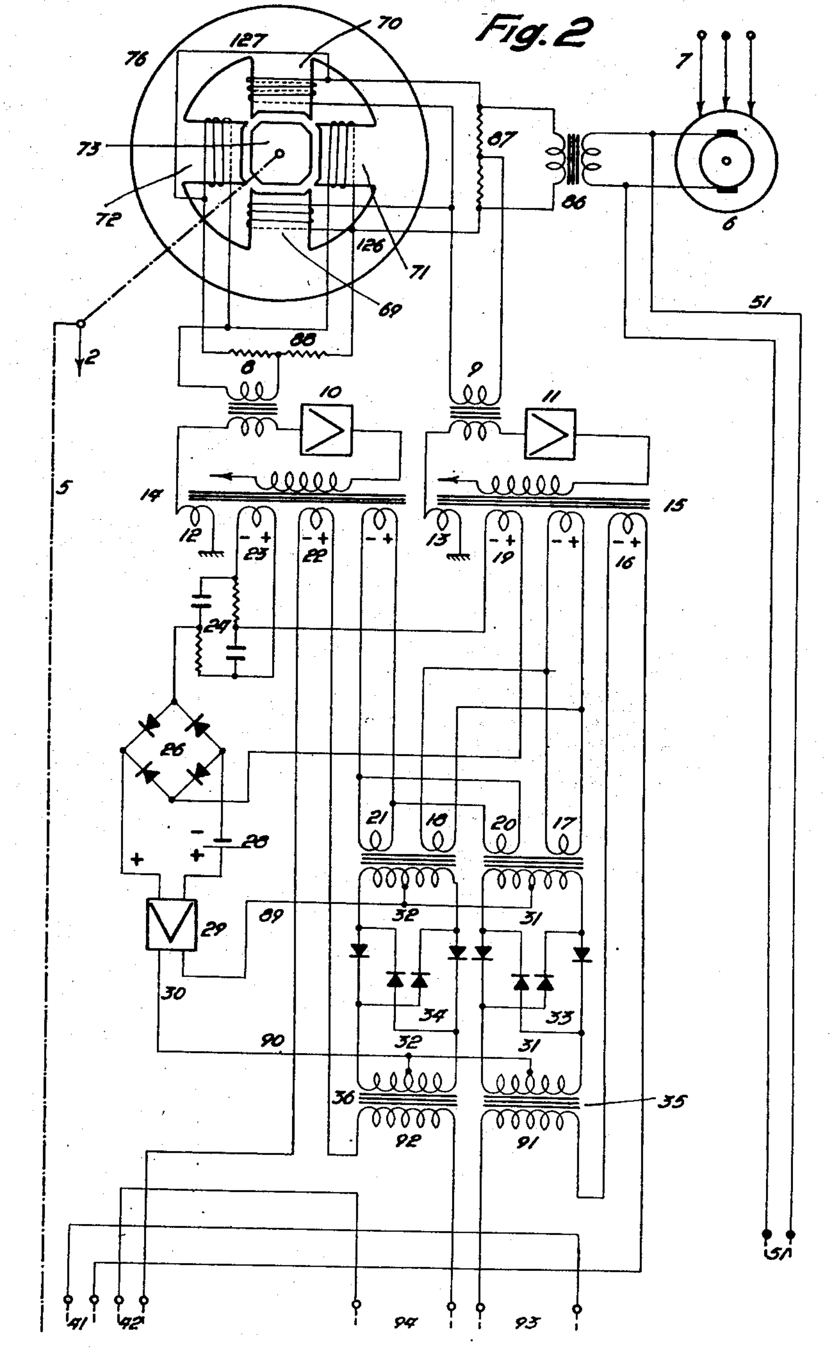
Figure 3:
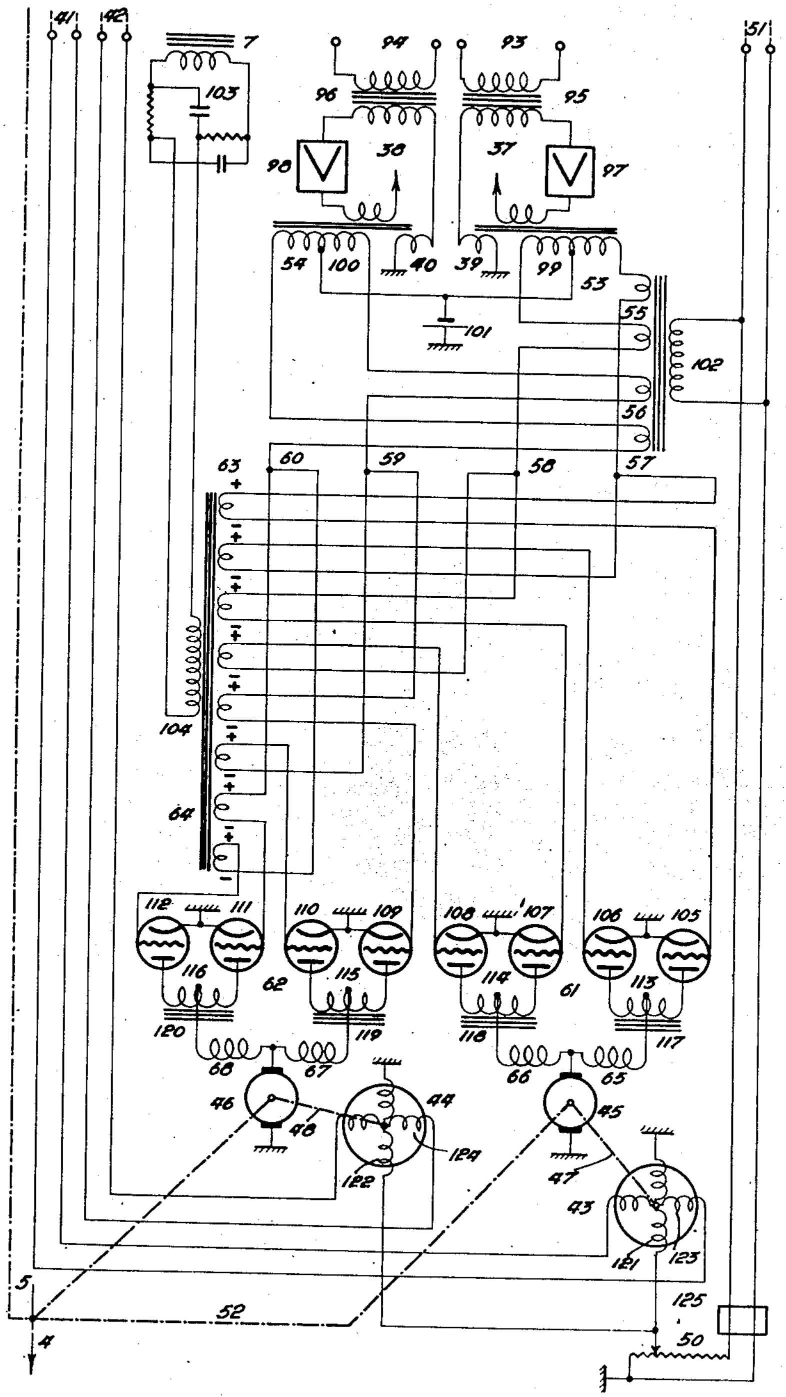

Figs. 2 and 3 diagrammatically show a complete diagram of an embodiment of a recopying servo-mechanism according to the invention wherein Fig. 2 indicates a right section of the tracing head, according to the invention, the diagrams being readable by placing Fig. 3 below Fig. 2 as a continuation thereof.

The tracing head, of Fig. 2, comprises a magnetic core 73, carried by a rigid axis 74 carrying at its end a feeling member 2 supposed to follow the profile of a model 1. This magnetic core is carried by a calling back arrangement such that in absence of unbalanced condition of the mobile equipment of the tracing head, an electric balance is obtained, the interferric space of the two pairs of poles 69—70 and 71—72 carried by the annular frame 76, being equal, under rest condition.

Poles 69 and 70 carry two opposed windings forming two legs of a Wheatstone bridge, the two other legs of which are constituted by the resistors of a potentiometer 87; a bridge diagonal, at the potentiometer terminals, is fed by the secondary of a transformer 86, the primary of which receives an R. F. oscillation from a generator 6, such as an alternator or convertor, itself fed at 7 by the mains. By way of example, it may be considered that this convertor delivers a one phase alternating current voltage at 1000 cycles mains. For simplicity sake, said R. F. voltage will be hereafter referred to as a carrier oscillation.

Poles 71 and 72 are equipped in the same way with opposed windings constituting two legs of a Wheatstone bridge the two other legs of which are constituted by the resistors of a potentiometer 88. The two circuits are arranged in parallel as indicated by connections 126 and 127.

The lines of force of the R. F. magnetic field close in four magnetic circuits closed through core 73, the magnetic bridges are balanced and therefore any parasitic variation of permeability, temperature, etc., is compensated.

When the magnetic core is under rest condition, the voltages developed at the diagonals of the Wheatstone bridges, ending at the transformer primaries 9 and 8, respectively are equal to zero.

When said core, driven by the displacement of the feeling member 2 along the profile of model 1, reaches a thrown off center position, two unbalanced voltages appear, with the same carrier frequency, at the diagonals, the effectual values of which are proportional to the spacings, according to axis X—X and Y—Y, not represented, of the pairs of poles 71—72 and 69—70, and these voltages are of same phase or of opposed phase to that of the carrier oscillation according to the profile, so that the voltage developed across the terminals of transformer 8 is normally inclusive of the component $\pm\delta y$, and the voltage developed across the terminals of transformer 9 is inclusive of the component $\pm\delta x$ of the above mentioned vector $\delta$.

In such a balanced tracing head, the magnetic core 73 must always be called back towards its center position; several mechanical arrangements may be taken into consideration for that purpose, and at Fig. 1 is diagrammatically shown by way of example such a call back arrangement.

Axis 74 is extended rearwards with respect to core 73 and is provided with a plate 78, which by means of bearing balls (three bearing balls at 120° for example) exert a pressure in resting against a circular ring which rests itself, through three bearing balls, also spaced by 120° but shifted in relation with the first ones, against one internal flange 77 of the casing of the tracing head; the directions of the bearing balls casing are orthogonals. The rear end of axis 74 slides into a support 81, as indicated at 80, and this support is constantly under the pressure of a spring 82 bearing on plate 78 so that its point 83 bears against the conical wall 85 of a hard metal seat inserted into the corresponding face of the housing. Thus, axis 74 may move without rotation according to any control transmitted from the feeling member, while being constantly urged towards its center position.

Referring now more particularly to the arrangement shown in Fig. 1, the model 1 is followed by the feeling member 2. The reproduction is shown at 3 and the reproducing tool at 4. The mechanical link 5 insures the simultaneous driving of parts 2 and 4, independently of the profile, for instance at a uniform speed, through means not shown and out of the scope of the present invention.

The homothety of displacements of feeling member 2 on the model and of the tool 4 on the reproduction, is obtained through the servo-mechanism control of the two carriage motors 45 and 46, linked to said tool through the mechanical link.

Voltages $\pm\delta x$ and $\pm\delta y$ delivered by the tracing head are respectively amplified at 11 and 10 through A. C. amplifiers provided with counter-reaction circuits 12 and 13. These amplified voltages have as provided for in the present invention, their references inverted, that is to say that for a voltage $\mp\delta y$, it considered that the amplified voltage is $\pm Ux$ and that for a voltage $\pm\delta x$ it is considered that the amplified voltage is $\pm Uy$; this simple consideration, enabling the passage of vector $\delta$ to vector $\tau$, for a predetermined travel direction of the feeling member, and vice versa for the other travel direction, and $\pm Ux$ corresponding then to $\pm\delta y$ and $\pm Uy$ corresponding to $\pm\delta x$.

The adjustment spacing $\pm S$ is controlled as hereunder described; from the output circuit 14 of amplifier 10, through lead 23, the voltage $Ux$ is applied onto a divider point 25 to which is returned a voltage of same value as $Uy$, derived, for this purpose, from circuit 15 in the output of amplifier 11, but set in quadrature, in lead 19, through inserting a dephasing network 24. (Such setting into quadrature may just as well be performed on voltage $Ux$.)

The divider point 25 connects to a rectifier 26, the output of which opposes at 28 a direct voltage of reference spacing $\delta_0$, derived, for example from a rectifier 27 fed by the mains 7. It is to be noticed here, that the various necessary voltages are all formed as from the power supply network in order that any variation of this network will be noticed in the derived voltages, and that in this way the necessity of correcting the network variation at the comparison locations of the servo mechanism is eliminated.

From point 28, the voltage $\delta-\delta_0$ is amplified at 29 and from the output 30 of this amplifier are connected the two modulation circuits 31 and 32 applying voltage $\pm S$ onto the two modulators 33 and 34.

These modulators each receive, as carrier modulation itself, an oscillation derived through combination of voltages $Ux$ and $Uy$. In the example considered, the oscillation applied onto modulator 33 results from adding, through circuits 17 and 20, respectively, voltages $+Uy$ and $-Ux$, whence the oscillation applied onto modulator 34 results from adding, through circuits 18 and 21, respectively, voltages $+Ux$ and $+Uy$. The output of modulator 33 is therefore a voltage at the frequency of the carrier oscillation, with an effectual value $S(Ux-Uy)$ whence the output of modulator 34 is a voltage of the same carrier frequency, with an effectual voltage $-S(Ux+Uy)$.

The modulated output voltage of 33, is supplied through link 35, connected with the input of an amplifier 37 with a counterreaction circuit 39 and the modulated output voltage of 34, is supplied through link 36, connected with the input of an amplifier 38 with a counterreaction circuit 40. The other voltages necessary for controlling servitude signals are impressed upon the respective inputs of these amplifiers, that is, voltage $Uy$ onto amplifier 37 and voltage $Ux$ onto amplifier 38, through respective leads 19 and 22, on the other hand, the respective measure voltages $-Umy$ and $-Umx$ of the rotation speed of the motors 45 and 46 are also brought into said inputs through leads 41 and 42.

These measure voltages are controlled through tachometers 43 and 44, respectively driven by mechanical links 47 and 48 driven from the rotation axis of the motors 45 and 46; these tachometers are fed by a reference voltage, adjusted at 50 and applied onto them through lead 49. This reference voltage is of the carrier frequency, being impressed through lead 51 from generator 6.

The servitude signals being thus controlled are respectively applied onto phase discriminators 53 and 54, with each one of two distinct outputs 57—58 and 59—60; these signals are respectively directed towards one or the other of these outputs by comparison of their phase with that of the reference oscillation, carrier, applied onto these discriminators through leads 55 and 56.

Each pair of outputs 57—58 and 59—60 are connected to a control circuit of network power supply, and to inductor windings 65—66 and 67—68 respectively of reversible rotation motors 45 and 46; these circuits are indicated at 61 and 62 and are fed by said network voltage through leads 63 and 64.

Detailed illustration of the members and circuits of such a servitude channel for recopying are shown in Figs. 2 and 3. As far as possible, the reference numerals of Fig. 1 are shown in Figs. 2 and 3 applied to like parts.

The transformers 8 and 9 for the voltages delivered by the tracing head are arranged to apply these voltages onto tube amplifier stages 10 and 11, the high frequency of which is supplied through the primaries of their output transformers 14 and 15 with multiple secondaries, and the stabilization of which through high counter-reaction is precisely insured by the secondaries 12 and 13 having one end grounded, and the other connected to the secondary of their respective input transformer 8 or 9.

The voltages appearing at the terminals of secondary winding 19 of transformer 15, and secondary winding 23 of transformer 14, are impressed in quadrature on the phase shifting network comprising resistor-capacitors 24 and the resultant voltage is rectified through bridge 26.

From the output terminal of bridge 26 two leads are connected to symmetrical direct current amplifier 29. In the negative lead from the output of the bridge there is provided a counter-battery voltage 28 supplying opposition voltage to establish the maximum adjustment desired for admissable spacing; this counter-battery may of course be constituted of a rectifier fed by the mains, as over mentioned. At the output 30 of amplifier 29, thus appears, on leads 89 and 90, the adjustment spacing voltages $\pm S$. Leads 89 and 90 are respectively connected to the middle points 31 of the input and output windings of modulator 33 and onto the middle points 32 of the corresponding winding of modulator 34. These two modulators are of the conventional type. The rectifiers are preferably of the dry type.

The input transformer of modulator 33 is provided with two primary windings 17 and 20, respectively fed by secondary windings of transformers 15 and 14, in relative phase opposition; the input transformer of modulator 34 is provided with two primary windings 18 and 21, respectively fed by the same secondary windings of transformers 15 and 14, but in phase concordance. The modulated voltages thus obtained are transmitted through the secondary windings 91 and 92 of the modulators output transformers 35 and 36.

The output of generator 6 of carrier frequency is shunted at 51 and applied in parallel through this shunt onto windings 121 and 122 of tachometer devices 43 and 44—Fig. 3—as reference oscillations, calibrated by a posting potentiometer after phase shifting of 90° in 125.

This potentiometer may furthermore consist, when necessary, in a potentiometer fed as from a transformer located at the end of shunt 51, provided with a middle point of secondary winding to the ground.

The two windings 125 and 124 of the two tachometers, respectively orthogonal with the windings fed by the reference oscillation, therefore, deliver measure voltages of respective rotation speed of motors 45 and 46, on circuits 41 and 42; these voltages are of the carrier frequency and are in phase or in phase opposition with this oscillation.

Through circuit 41, the winding 123 of tachometer 43 of motor 45 (carrying the tool along axis of the Y) is connected in subtractive series (phase opposition) to the secondary winding 16 of transformer 15, in an outlet lead of the secondary winding 91 of modulator 33. Thus, between terminals 93, is established a servitude voltage of the shape $S(Ux-Uy)+Uy-Umy$ and applied onto the input transformer 95 of the amplifying stage 37. This amplifying stage is arranged in an analogous way to that of the output amplifiers of the tracing head, that is to say, that it comprises a tube stage 97 fed with high voltage through the primary winding of its output transformer, whence the desired high counterreaction is supplied by a secondary winding 39 of this output transformer, one end of which is grounded and the other connected to the secondary winding of the input transformer 95 arranged in series with the tube stage 97.

Similarly, the winding 124 of tachometer 44 of motor 46 (carrying the tool along the axis of the X) is connected in subtractive series, through circuit 42, to the secondary winding 22 of transformer 14, in an output circuit of the secondary winding 92 of modulator 34. Thus is established across terminals 94, a servitude voltage of the shape $-S(Ux+Uy)+Ux-Umx$ applied onto the input transformer 96 of the amplifier stage 38. This amplifier stage is similar to stage 37 and comprises a tube stage 98 and a counter-reaction secondary winding 40.

The amplifier stages 37 and 38 connect with the phase discriminator circuits 53 and 54, in order to direct the servitude high frequency signals, respectively on one or the other pair of discharge tubes 105—106 and 107—108 fed according to either rotation direction of motor 45, and on one or the other pair of discharge tubes 109—110 and 111—112 fed according to either rotation direction of motor 46.

From these discriminators, the fixed polarization voltage of the discharge tube control grids is applied, through battery 101, onto the middle points 99 and 100 of the secondary windings of the output transformers of stages 37 and 38, constituting the discriminators input.

The discrimination takes place through the superposition, in each starting lead of these secondary windings, of the reference carrier voltage, non-modulated, introduced by the series arranged secondary windings 55 and 56 (two secondary windings for each servitude way) of transformer 22 for deriving the carrier oscillation from shunt 51. In this way, the phase discrimination is automatically performed in the four circuits 57, 58, 59 and 60 which lead to the control grids of the discharge tubes in each pair.

It is necessary, in order to control the discharge tubes, to superpose on to the high frequency servitude voltages, other voltages of the network power supply frequency, in quadrature with said voltage as applied to the plate transformers 117 to 120 of the pairs of tubes, this voltage in quadrature progressing for one tube of each pair and being delayed for the other tube.

This is accomplished in a simple way, by deriving the power supply voltage 7, and in phase shifting it (Fig. 3) by setting the voltages into quadrature in network 103; after which the phase shifted voltage is applied onto the primary winding 104 of a transformer provided with eight secondary windings 63—64, alternately series connected, in concordance and phase opposition, in the connecting leads starting from the four points 57-60 and reaching the control grids of tubes 105 to 112, respectively; this voltage in quadrature is applied through the direct lead of the superior secondary winding, in additive series, onto the control grid of tube 105, and through the direct lead, in subtractive series, of the immediately inferior winding onto the control grid of tube 106 for the signal appearing at 57 . . . and so on.

As usual, the feeding of windings 65—66 of motor 45 takes place as from the middle points 113 and 114 of transformers 117 to 118, and the feeding of the windings of motor 46, as from the middle points 115—116 of transformers 119 and 120.

While I have described my invention in certain preferred embodiments I realize that modifications may be made and I desire that it be understood that no limitations upon my invention are intended other than may be imposed by the scope of the appended claims.

What I claim is:

1. A reproducing servo-mechanism system in which the similarity of the trajectories of a feeling member on a model and of a reproducing member on a blank is assured by controlling the speeds and direction of rotation of two motors moving the reproducing member along two directions at right angles, a feeling member, a tracer head connected to said feeling member, a reproducing member, a pair of motors, a tachometer connected to each of said motors, said tracer head and said tachometers being supplied with a voltage the frequency of which is higher than that which is supplied to said motors, said head delivering two signals in connection with the displacement of the feeling member and said tachometers delivering two signals in connection with the speed and rotation of said two motors, a pair of modulators, each of said modulators receiving a carrier oscillation at the said higher frequency and adapted to modulate said carrier oscillation by the difference signal between a fixed D. C. voltage representing the maximum regulating difference, and a voltage representing the real difference obtained by mixing one of the two signals from the tracer head set in quadrature phase relation with the other signal, means for rectifying the mixed signal, a pair of mixing elements, each receiving the output signal from one of said modulators, one of the output signals from said tracer head and the output signal from one tachometer measuring the velocity of the motor moves the reproducing member in a direction at right angles to the component of the displacement of the feeling member represented by the signal from the tracer head, phase discriminating elements for the output signals from the mixing elements, said phase discriminating elements employing a reference phase oscillation at the said high frequency and twin channels from each of the output channels of the phase discriminators, a pair of discharge tubes each including an ignition electrode, said discharge tubes controlling one of the directions of rotation of one of the motors, said twin channels from each of the output channels of the phase discriminators being respectively connected with said ignition electrodes and receiving superimposed thereon a signal at the motor supply frequency in quadrature phase relation with the supply frequency but in phase opposition with the signal applied to the other twin channel from the same output channel.

2. A reproducing servo-mechanism system as set forth in claim 1 in which the carrier oscillation applied to the modulators is constituted by the signals representing the displacement of the feeling member, in phase concordance for one modulator, and in phase opposition for the other.

3. A reproducing servo-mechanism system as set forth in claim 1 in which the tachometers each comprise a stator with two pairs of poles at right angles, each carrying a winding, to one of which the high frequency voltage is supplied, and from the other one of which the voltage measuring the velocity of the motor is derived.

4. A reproducing servo-mechanism system as set forth in claim 3 in which the tachometers each comprise a stator core surrounded by a stationary ring, both formed from ferromagnetic material and a rotor of diamagnetic material mounted in the air gap between said core and said ring, said rotor being mechanically connected to rotate with the associated motor.

PIERRE LOUIS GABRIEL MOREL.

References Cited in the file of this patent

UNITED STATES PATENTS

| Number | Name | Date |
|---|---|---|
| 2,116,593 | Bouvier et al. | May 10, 1938 |
| 2,437,603 | Hornfeck | Mar. 9, 1948 |
| 2,473,424 | Grabau | June 14, 1949 |
| 2,494,663 | Lobosco | Jan. 17, 1950 |
| 2,499,178 | Berry et al. | Feb. 28, 1950 |
| 2,559,575 | Fryklund | July 3, 1951 |